United States Patent

Warizaya

[11] Patent Number: 5,619,127
[45] Date of Patent: Apr. 8, 1997

[54] INRUSH CURRENT SUPPRESSING POWER SUPPLY

[75] Inventor: Kanji Warizaya, Tokyo, Japan

[73] Assignee: NEC Corporation, Japan

[21] Appl. No.: 552,752

[22] Filed: Nov. 3, 1995

[30] Foreign Application Priority Data

Nov. 10, 1994 [JP] Japan .................................. 6-276186

[51] Int. Cl.$^6$ ...................................................... G05F 5/00
[52] U.S. Cl. ........................ 323/275; 323/299; 323/908; 363/49; 363/50
[58] Field of Search ..................................... 323/299, 303, 323/275, 276, 277, 901, 908; 363/15, 49, 50, 89

[56] References Cited

U.S. PATENT DOCUMENTS

| 4,494,064 | 1/1985 | Harkness | 323/277 |
| 4,866,590 | 9/1989 | Odaka et al. | 363/49 |
| 5,283,707 | 2/1994 | Conners et al. | 323/908 X |
| 5,341,279 | 8/1994 | Yamada | 363/15 X |

FOREIGN PATENT DOCUMENTS 4-17517  1/1992  Japan .................. H02H 9/02

*Primary Examiner*—Peter S. Wong
*Assistant Examiner*—Y. J. Han
*Attorney, Agent, or Firm*—Hayes, Soloway, Hennessey, Grossman & Hage, P.C.

[57] ABSTRACT

Main power supply circuit includes an inrush current suppressing circuit serially connected between its rectifying circuit and a load, this inrush current suppressing circuit being composed of a current limiting resistor and an FET switch that is serially connected to this resistor. An auxiliary power supply circuit provides power for a control circuit of the main power supply circuit, and, after the power supply switch is closed, a delay circuit monitors rise of a charge voltage of a smoothing capacitor within the main power supply circuit as well as rise of control circuit voltage of the auxiliary power supply circuit and establishes a delay time. After the elapse of the delay time, the FET switch is turned ON and the inrush current suppressing circuit is closed. The inrush current suppressing circuit is then short circuited within a short time period and the load operation is continued. Even if the power supply is cut and then reclosed within a short time interval, a delay interval is interposed without fail and the inrush current suppressing circuit closed, thereby preventing heat damage.

4 Claims, 2 Drawing Sheets

INRUSH CURRENT SUPPRESSING POWER SUPPLY

BACKGROUND OF THE INVENTION

1. Field of the Invention

The present invention relates to a power supply suitable for a data processor, etc. and particularly to a rectifier-type direct-current power supply having an inrush current suppressing circuit for preventing an inrush current at the time of closing the power supply.

2. Description of the Related Art

When directly impressing a power supply voltage to the input section of a rectifier-type direct-current power supply, the large-inrush current, which is determined by the minimum impedance of the circuit as seen from the input section, flows instantaneously and tends to cause damage to bridge rectifiers. Even with the inrush current limiting circuits that are commonly used to suppress inrush current, there is the problem that in cases of repeated reclosing within a short time interval after cutting alternating-current input voltage, the inrush current suppressing circuit cannot be caused to operate due to damage caused by heat generation of the circuit. Japanese Patent Laid-open No. 17517/92 discloses a technique by which, upon start-up, a smoothing capacitor is first charged to a prescribed charge voltage by a charging apparatus by way of a current-limiting resistor, upon which a magnetic contactor of a main rectifying circuit is closed, thereby preventing inflow of a large inrush current to the smoothing capacitor. However, even this method fails to function if the impedance of load 13 is extremely low.

SUMMARY OF THE INVENTION

The object of the present invention is to provide a rectifier-type direct-current power supply capable of operating an inrush current suppressing circuit and reliably limiting inrush current regardless of load impedance even when inadvertently reclosing a power supply within a short time interval.

To achieve this object, the present application comprises a main power supply circuit which rectifies an alternating-current input and supplies direct-current output to a load and which is provided with an inrush current suppressing circuit connected in series between a rectifying circuit and a smoothing capacitor; an auxiliary power supply circuit which rectifies the alternating-current input and supplies direct-current power for a control circuit of the main power supply circuit; and a delay circuit which monitors the voltage of said smoothing capacitor that rises due to charging current supplied from the auxiliary power supply circuit after closing the alternating-current input to the main power supply circuit and the auxiliary power supply circuit, and then closes the inrush current suppressing circuit after the elapse of a delay time which is established within delay circuit.

As an embodiment of the present invention, the inrush current suppressing circuit of the main power supply circuit includes a resistor and a Field Effect Transistor (FET) switch serially connected to that resistor; and the main power supply circuit is constructed so as to short circuit with the inrush current suppressing circuit a short time after closing of the inrush current suppressing circuit.

As another embodiment of the present invention, the delay circuit comprises a photocoupler that opens and closes the FET switch, a first comparison circuit that compares and confirms whether or not a rise voltage that is voltage-divided from the smoothing capacitor voltage that rises due to the charging current supplied from the auxiliary power supply circuit exceeds a first rise voltage-divided from the output voltage of the auxiliary power supply circuit, a second comparison circuit that compares and confirms whether or not a second rise voltage exceeds a third rise voltage, both second and third rise voltages being voltage-divided from output voltage of said auxiliary power supply circuit and the photocoupler being configured to close the FET switch when the first comparison circuit confirms that the rise voltage exceeds the first rise voltage and, next the second comparison circuit confirms that the second rise voltage exceeds the third rise voltage. The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

The embodiments of the present invention will next be explained in detail with reference to the accompanying figures.

Figure 1:
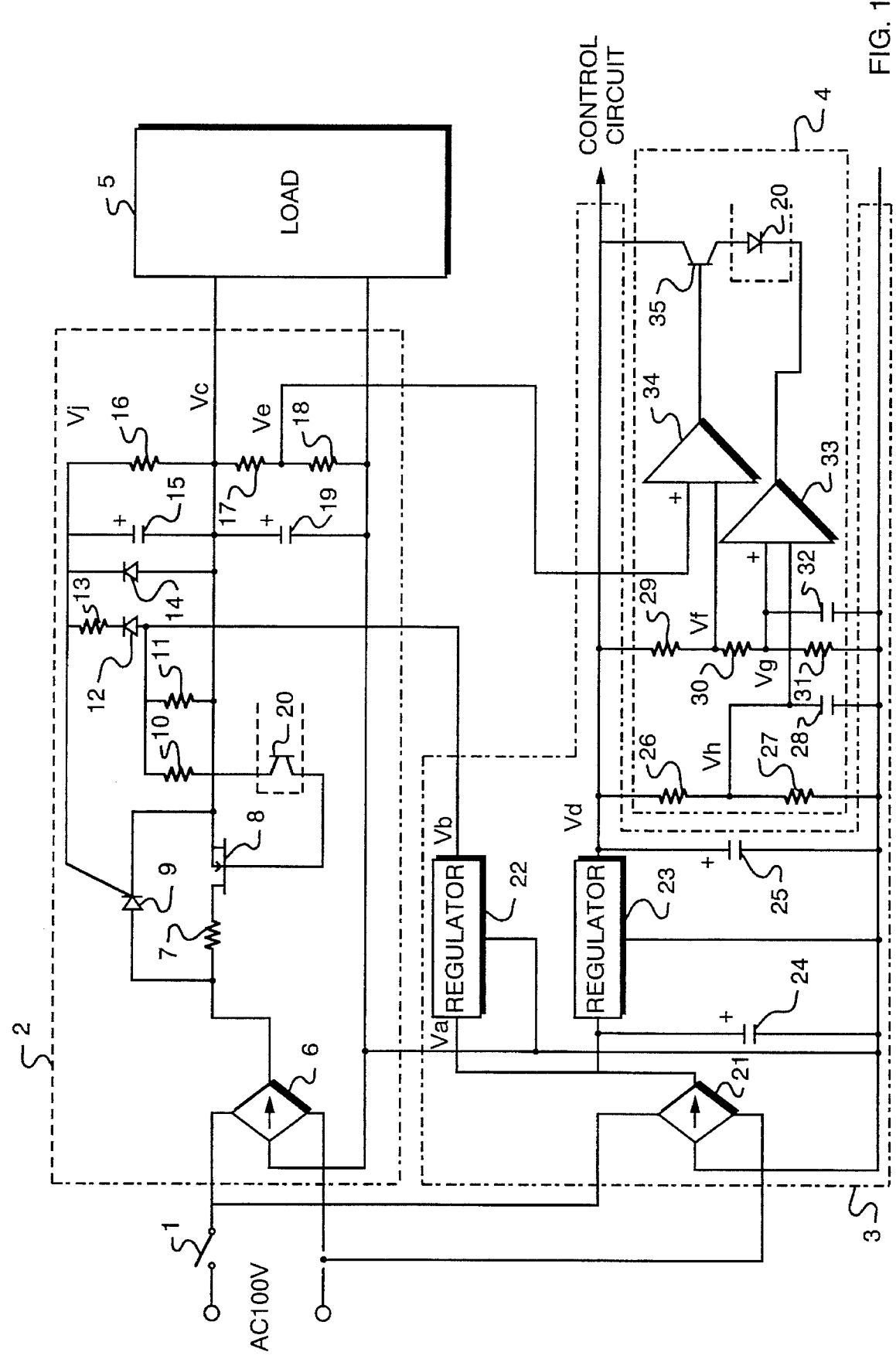
FIG. 1 is a circuit diagram showing the construction of one embodiment of the inrush current suppressing power supply according to the present invention.

FIG. 1 shows the circuit construction of one embodiment of the present invention which comprises a switch 1 that opens and closes input from a 100-V alternating-current power supply; a main power supply circuit 2 having an inrush current suppressing circuit that receives the 100-V alternating-current input by way of the switch 1; an auxiliary power supply circuit 3 that supplies electrical power to a control circuit (not shown) of the main power supply circuit 2; and a delay circuit 4 that monitors the rise voltage of the output from the auxiliary power supply circuit 3, and by comparing and confirming voltages within each circuit after the passage of a fixed time, delays the starting time of input of the rectified output of the main power supply circuit 2 to the inrush current suppressing circuit.

The main power supply circuit 2 includes a bridge rectifying circuit 6 that rectifies the applied 100-V alternating-current input to direct current; an inrush current suppressing circuit made up of current-limiting resistor 7 connected to this rectifying circuit 6 and an FET switch 8 having its drain terminal connected to the current-limiting resistor 7; a thyristor 9 connected in parallel with this inrush current suppressing circuit; a resistor 13, diode 14, capacitor 15, and resistor 16 each having one terminal connected to the gate terminal of this thyristor 9; a diode 12 having its cathode terminal connected to the other end of resistor 13 and its anode terminal connected to one end of each of resistor 10 and resistor 11; the other terminals of each of resistor 11, diode 14, capacitor 15, and resistor 16 being connected to the source side of the FET switch 8; and the other terminal of resistor 10 being connected to phototransistor of a photocoupler 20 included in the delay circuit 4. The output of this phototransistor is also supplied to the gate of the FET switch 8. The voltage Vc between the terminals of smoothing capacitor 19 is voltage-divided by resistor 17 and resistor 18 to generate voltage Ve. Load 5 is parallel connected to smoothing capacitor 19 and is supplied with direct-current output of voltage Vc generated by smoothing capacitor 19.

The auxiliary power supply circuit 3 includes a bridge rectifier 21 which rectifies the input of the 100-V alternating-current power supply to direct current; a smoothing capacitor 24 parallel connected to this bridge rectifier 21; regulators 22, 23 that are operated by the direct-current voltage Va generated by smoothing capacitor 24; and capacitor 25 for stabilizing output that is parallel connected to regulator 23. The output of regulator 22 is connected to the node of resistor 11 and diode 12 of main power supply circuit 2. In addition, the output of regulator 23 becomes the power supply of the control circuit (not shown).

The delay circuit 4 includes resistors 26 and 27 which voltage-divide the output voltage Vd of regulator 23; resistor 29, resistor 30, resistor 31, capacitors 28, 32, comparators 33, 34, photocoupler 20, and transistor 35. Capacitor 28 is connected to the voltage-division node of resistor 26 and resistor 27 and generates voltage Vh, and capacitor 32 is connected to the voltage-division node of resistor 30 and resistor 31 and generates voltage Vg. Voltage Vh generated by capacitor 28 and voltage Vg generated by capacitor 32 are each inputted to comparator 33, their levels are compared, and the output of comparator 33 is connected to the cathode of light-emitting diode included within photocoupler 20.

One terminal on the inputsside of comparator 34 is connected to the voltage-division node of resistor 29 and resistor 30, the other input terminal is connected to the voltage-division node of resistor 17 and resistor 18 of main power supply circuit 2, the respective voltages Vf and Ve are compared, and the output is connected to the base of transistor 35. Transistor 35 is connected to the positive side of the control circuit power supply and the anode side of the light-emitting diode of the photocoupler 20, and together with the photocoupler 20, constitutes the ON/OFF switching circuit of FET switch 8.

The operation of this embodiment will next be explained in accordance with FIGS. 2(a) and 2(b).

Figure 2A:
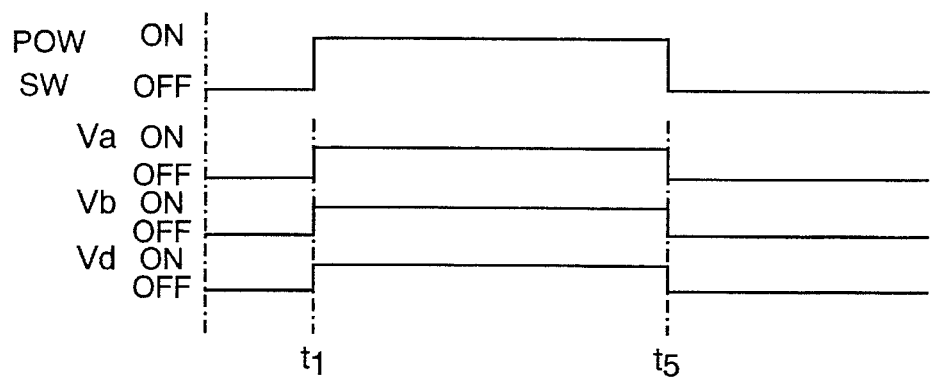
FIG. 2(a) is a timing chart showing the ON/OFF operation of switch 1 of FIG. 1 and the accompanying ON/OFF states of each of Voltages Va, Vb, and Vc generated within the auxiliary power supply device.
Figure 2B:
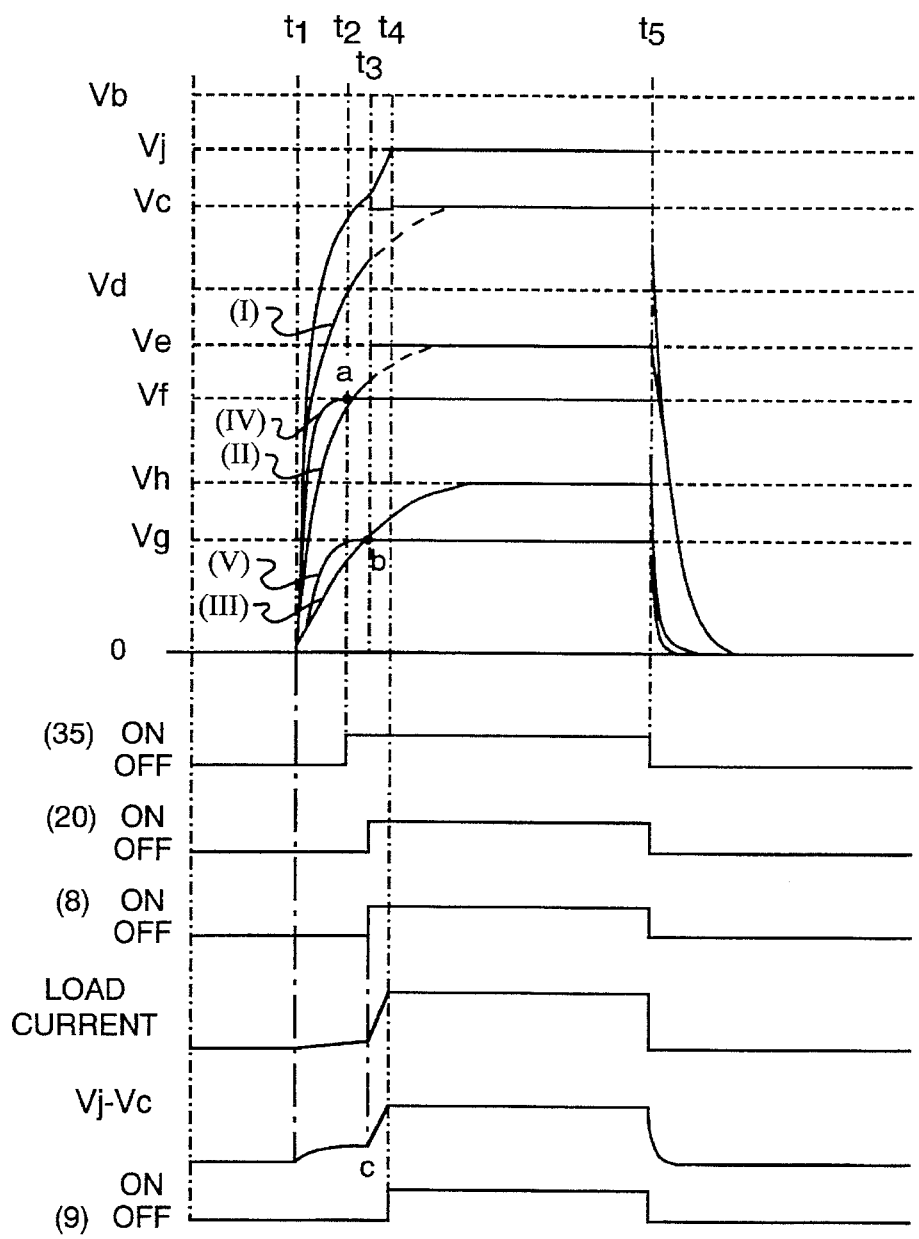
FIG. 2(b) is a timing chart showing the relation between the rise curves of each of voltages Vc, Ve, Vf, Vg, Vh, and Vj and the levels of voltage Vb and Vd as well as the closing-short circuit operation of the inrush current suppressing circuit.

In this case, the level of each of the voltages from Vb to Vj is set to the relation shown in FIG. 2(b), each of the time constants of the capacitor (32, 19, 28) charging circuits is set according to the relation:

$$C32 \cdot (R29+R30) < C19 \cdot R11 < C28 \cdot R26.$$

(1) FIG. 2(a)

When switch 1 is turned ON at time $t_1$ and a 100-V alternating current is inputted, a rectified voltage Va is generated from bridge rectifying circuit 6 in main power supply circuit 2 and from bridge rectifying circuit 21 in auxiliary power supply circuit 3. Rectified voltage Va in auxiliary power supply circuit 3 is stepped up to voltage Vb at regulator 22, and stepped down to voltage Vd at regulator 23.

(2) FIG. 2(b)

The output voltage Vb of regulator 22 passes through resistor 11 and charges capacitor 19, which in turn generates voltage Vc (Curve 1). Voltage Vc is voltage-divided by resistor 17 and resistor 18 to generate voltage Ve (Curve II). At the same time, voltage Vb is voltage-divided by resistor 13 and resistor 16 to both generate voltage Vj and charge capacitor 15. On the other hand, the output voltage Vd of regulator 23 is voltage-divided by resistor 26 and resistor 27 to generate voltage Vh (Curve III), and voltage-divided by resistor 29, resistor 30, and resistor 31 to generate voltage Vf (Curve IV). Finally, voltage Vf is voltage-divided by resistor 30 and resistor 31 to generate voltage Vg (Curve V).

Accordingly, at point a (time $t_2$) at which voltage Ve exceeds voltage Vf, comparator 34 inverts output and turns ON transistor 35.

Next, at point b (time $t_3$) at which voltage Vh exceeds voltage Vg, comparator 33 inverts output, electricity flows through the light-emitting diode of photocoupler 20 which emits light and causes the phototransistor to operate, and turns ON FET switch 8. When FET switch 8 operates, current flows to the inrush current suppressing circuit made up of resistor 7 and FET switch 8, and charging current flows to capacitor 19. Accordingly, the voltage Vc of capacitor 19, which was rising by way of regulator 22 during the interval from time $t_1$ to time $t_3$, increases steeply at time $t_3$; voltage Vj at the other terminal of capacitor 15, which is connected to one terminal of capacitor 19, also rises sharply; and thyristor 9, which has its gate connected to this capacitor 15, turns ON at time $t_4$, resulting in some increase in voltage $V_c$ and load current. The load current thereafter flows through thyristor 9.

At time $t_5$, switch 1 turns OFF, capacitor 28 discharges within a short time interval through resistor 27, capacitor 32 discharges within a short time interval through resistor 31, and in this case, the circuit time constants C·R are set according to the relation:

$$C28 \cdot R27 < C32 \cdot R31.$$

Here, the 100-V alternating-current input is turned OFF, and the load current stops flowing. After a short time interval, the 100-V alternating-current power supply is resumed, and closing of rectified output is delayed for a time interval corresponding to the time constant of the circuit made up of resistor 26 and capacitor 28.

As explained hereinabove, the present invention ensures that the power supply is protected and improves reliability because no response occurs within the delay time and current limiting resistance is always be closed without fail even when a power supply is inadvertently reclosed within a short interval of time. It is to be understood, however, that although the characteristics and advantages of the present invention have been set forth in the foregoing description, the disclosure is illustrative only, and changes may be made in the arrangement of the parts within the scope of the appended claims.

What is claimed is:

1. An inrush current suppressing power supply comprising:

a main power supply circuit which rectifies an alternating-current input and supplies direct-current output to a load and which is provided with an inrush current suppressing circuit connected in series between a rectifying circuit and a smoothing capacitor;

an auxiliary power supply circuit which rectifies the alternating-current input and supplies direct-current power for a control circuit of said main power supply circuit; and a delay circuit that monitors voltage of said smoothing capacitor that rises due to charging current supplied from said auxiliary power supply circuit after closing the alternating-current input to said main power supply circuit and said auxiliary power supply circuit, and then closes said inrush current suppressing circuit after the elapse of a delay time which is established within said delay circuit.

2. An inrush current suppressing power supply according to claim 1 wherein the inrush current suppressing circuit of said main power supply circuit includes a resistor and a Field Effect Transistor (FET) switch connected in series to that resistor.

3. An inrush current suppressing power supply according to claim 1 wherein said main power supply circuit short circuits with the inrush current suppressing circuit a short time after the inrush current suppressing circuit closes.

4. An inrush current suppressing power supply according to claim 2 wherein said delay circuit comprises a photocoupler that opens and closes said FET switch; a first comparison circuit that compares and confirms whether or not rise voltage ($V_e$) that is voltage-divided from said smoothing capacitor voltage ($V_c$) that rises due to charging current supplied from said auxiliary power supply circuit exceeds a first rise voltage ($V_f$) that is voltage-divided from output voltage ($V_d$) of said auxiliary power supply circuit; a second comparison circuit that compares and confirms whether or not a second rise voltage ($V_h$) exceeds a third rise voltage ($V_g$), both rise voltages ($V_h$, $V_g$) being voltage-divided from output voltage ($V_d$) of said auxiliary power supply circuit; and said photocoupler closes said FET switch when said rise voltage ($V_e$) exceeds said first rise voltage ($V_f$) and, next, said second rise voltage ($V_h$) exceeds said third rise voltage ($V_g$).

* * * * *